March 2, 1926.

L. BOYD 1,575,187

SHOCK ABSORBER

Filed Oct. 2, 1924

INVENTOR.
Louis Boyd,

BY

Geo. P. Kimmel. ATTORNEY.

Patented Mar. 2, 1926.

1,575,187

UNITED STATES PATENT OFFICE.

LOUIS BOYD, OF SHEPHERDSVILLE, KENTUCKY, ASSIGNOR TO BOYD SHOCK ABSORBER COMPANY, OF SHEPHERDSVILLE, KENTUCKY.

SHOCK ABSORBER.

Application filed October 2, 1924. Serial No. 741,239.

*To all whom it may concern:*

Be it known that I, LOUIS BOYD, a citizen of the United States, residing at Shepherdsville, in the county of Bullitt and State of Kentucky, have invented certain new and useful Improvements in Shock Absorbers, of which the following is a specification.

This invention relates to shock absorbers for use upon motor vehicles and is particularly constructed for use upon those motor vehicles in which the springs thereof extend parallel with and above the axles of the machine.

The primary object of this invention is the provision, in a manner as hereinafter set forth, of a shock absorber adapted first, to eliminate the shock to the vehicle and the occupants riding therein, and second, to catch the rebound of the machine to prevent the same from bouncing a great deal when the wheels contact with a bump and thus insure riding comfort to the occupants. The device further acts, in catching the rebound of the vehicle, to prevent the springs from quick motion thus eliminating the chances of breaking any of the spring leaves.

Another object of the invention is the provision, in a manner as hereinafter set forth, of a shock absorber and snubber adapted to be supported by the perches which normally support the springs of the vehicle, and supporting and setting up a swinging connection between the ends of the vehicle springs and the axle of the machine, and further, providing an auxiliary spring which is flexed and reflexed when the main spring of the vehicle is placed under strain, thus relieving the main spring of a great amount of strain which it would otherwise be called upon to take.

A still further and final object of this invention is the provision, in a manner as hereinafter set forth, of a shock absorber and snubber of simple design, easily applied, sure and positive in action, and inexpensive to manufacture and install.

The invention will be best understood from a consideration of the following detail description taken in connection with the accompanying drawings forming a part of this specification, with the understanding that the invention is not confined to any strict conformity with the showing of the drawings, but may be changed and modified so long as such changes and modifications mark no material departure from the salient features of the invention as expressed in the appended claim.

Figure 3:
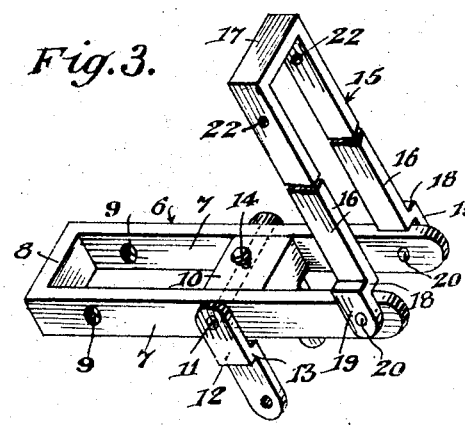
Fig. 3 is a perspective view of the device embodying this invention and intended for use in connection with the front vehicle spring, and, Fig. 4 is a perspective view of the device very slightly modified and of the type intended for use in connection with the rear spring of the vehicle.
Figure 4:
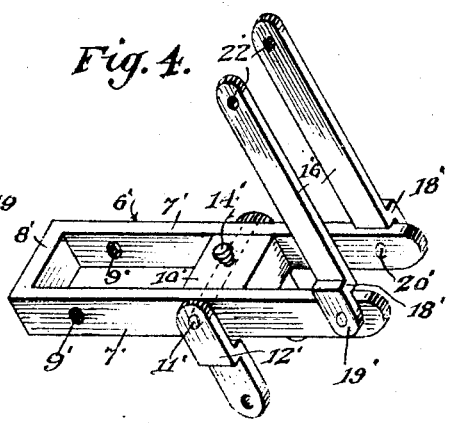

In the description of the drawings, wherein like numerals of reference indicate corresponding parts throughout the several views, an explanation will first be given of the showing of Fig. 1 and Fig. 3, which shows in perspective the structure of the shock absorber and snubber intended to be applied to the front spring of the vehicle for which the devices are intended.

Figure 1:
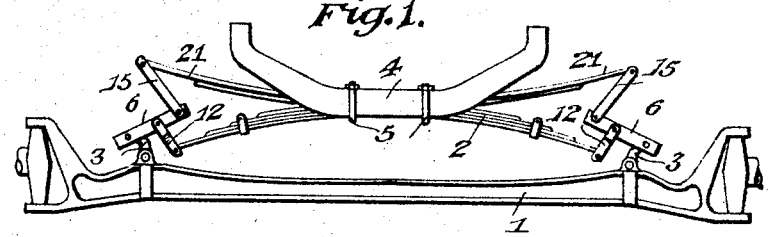
Figure 1 is a front elevation of the front axle and front spring of a vehicle of the type for which this device is intended, and showing the device applied thereto.

In Fig. 1, there is shown the front axle 1 of a vehicle having the semi-elliptical spring 2 positioned thereover and parallel therewith. This axle 1 has the usual spring perches 3 carried thereon which spring perches are normally turned toward the center of the axle but, in order to apply the shock absorber, they are turned outwardly as is shown. Under normal conditions, as is well known, the ends of the spring 2 are connected to the upper ends of the perches 3 when they are turned inwardly as mentioned. The usual front channeled cross member of the vehicle chassis frame is indicated at 4 and this cross member has secured thereabout the U-bolts 5 which retain the spring 2 in position in the channels of the member 4 as shown.

The device embodying this invention comprises a main yoke member, indicated generally by the numeral 6, comprising a pair of substantially elongated parallel spaced arms 7 connected together at one end by the integral cross member 8. The arms 7 each have formed therethrough oppositely positioned apertures 9, these apertures being located adjacent the connected outer end of the arm. This yoke member 6 is adapted to enclose the upper end of the perch 3 and the head of the perch, not shown, is located between the apertures 9 and a pivot pin or bolt is passed through the apertures and through the head and secured in position to retain the yoke thereon.

Positioned approximately midway between the ends of the arms 7 is a spacing bearing block 10 having a longitudinally extending bore therethrough to receive a pivot pin 11 upon the outer ends of which, which ends extend beyond the outer sides of the arms 7, there is pivotally connected one end of a connecting supporting link 12. If desired, use may be made of the supporting links which normally connect the ends of the spring 2 with the heads of the perches 3. While this manner of connecting would be satisfactory to a certain extent, still in order to set up a tight connection between the sides of the arms 7 and the ends of the spring 2, these special links 12 are provided, and each has its central portion set in as at 13 so that the lower end thereof will be positioned inwardly to be located beneath the arm 7 to which it is attached. The ends of the links 12 will then be properly spaced to snugly engage the end of the spring and eliminate any possibility of side play between the links and the end of the spring.

Threaded into the top of the block 10 is a grease cup 14 which communicates with the bore through the block and serves to keep the pin 11 lubricated to insure smooth and quiet action between the parts.

Connected to and across the outer end of the arms 7 is a swinging yoke, indicated generally by the numeral 15, and this yoke comprises a pair of upwardly extending arms 16 and a top cross connecting member 17. The lower end of each of the arms 16 is turned outwardly at right angles, as indicated at 18, and the terminal portion 19 engages over the outer face of an arm 7 and is pivotally secured thereto by means of a pivot pin 20. This connection as shown, is adjacent the outer end of the arm 7.

The upper end of the yoke 15 engages over the upwardly extending end of an auxiliary elliptic spring 21 and is pivotally secured thereto through the apertures 22 by suitable securing means. The spring 21 is a two-leaf spring and is similar to the two longest leaves of the spring 2 and is reversed in its position as shown, thus causing the outer ends to extend upwardly instead of running downwardly as does the end of the spring 2.

The central portion of the spring 21 extends across the top of the spring 2 and through the channel of the cross member 4 and is secured in position together with the spring 2 by means of the U-bolt 5.

Figure 2:
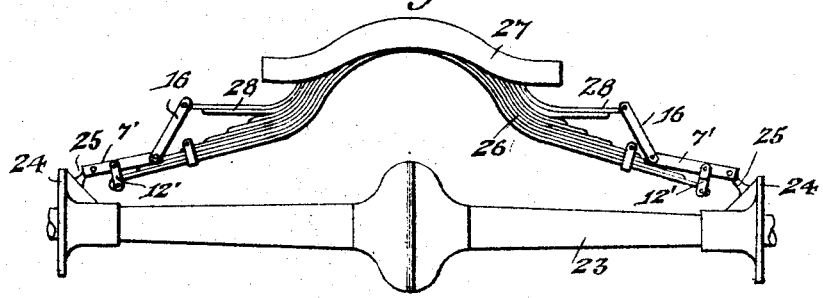
Fig. 2 is an elevation of the rear axle and rear spring of the same type of vehicle, showing the device applied thereto.

Referring now to Figure 2 there is shown a rear axle housing 23 having the end plates 24 which carry inwardly extending spring perches 25 to which there is normally connected by means of link members the rear spring 26. The rear cross member of the chassis frame of the vehicle is indicated at 27 and this member 27 is channel shaped like the member 4 and the spring fits into the channel of the member.

The shock absorber and snubber used in connection with the rear spring and axle, comprises the yoke 6' formed of the side members or arms 7' and the cross member 8'. The apertures 9' are in the same position, and this member has the cross connecting block 10', the pivot pin 11' and the depending link member 12'. This block 10' is also provided with a grease cup 14'.

The rear snubber 6' instead of having the yoke member 15, which is provided for the front snubber, is provided with spaced upwardly extending arms 16', the upper ends of which are separated as shown and are provided with apertures 22'. The lower ends of the arms 16' are turned outwardly as at 18' and the terminal portion 19' overlaps the ends of the arms 7' as do the terminal ends 19, in the snubber provided for the front axle. As will be seen the only difference in construction here is the elimination of the cross member 17 which connects the upper ends of the arms 16 as shown in Figure 3. It will be seen that in the member provided for use in connection with the front spring this cross yoke 17 will not interfere with the connection with the spring 21 as the arms 16 extend upwardly and outwardly from the vehicle, the spring ends 21 coming in beneath the cross member 17, whereas in the structure provided for use with the rear spring 26 the arms 16' lean inwardly toward the vehicle, and the auxiliary spring connected thereto would contact with a cross member, if it were present therefore connection between the upper ends of the arms 16' is done away with.

An auxiliary spring 28 is provided for use in connection with the rear spring and rear snubber, and as shown, this spring is a two-leaf spring and is of substantially the same contour as the rear spring of the vehicle, with the exception that the terminal ends of the spring extend outwardly and upwardly at a slight inclination instead of extending at a downward inclination as do the spring leaves of the spring 26. The central portion of the spring 28 extends across the top of the central part of the spring 26 and is covered and held in position by the cross channel bar 27.

The connecting links which normally connect the ends of the spring 26 with the perches 25 and which constitute a portion of the regular structure of the vehicle, may be used in connection with the rear snubber as described in connection with the front snubber, but it is preferable that the links 12' be used because of the inwardly positioned lower end of the links which brings them beneath the arms 7' to properly space the ends to receive therebetween and closely engage the ends of the spring 26.

From the foregoing description it will be readily seen that a novel and efficient shock absorber and snubber is provided which will be easily applied and easily kept in condition.

Having thus described my invention what I claim is:

In a device of the character set forth associated with a vehicle axle and spring, a relatively long yoke member adapted to be pivotally connected to a spring perch, depending links supporting one end of said spring from said yoke intermediate the ends thereof, a pair of upwardly extending arms pivotally connected to the other end of said spaced arms, and an auxiliary spring supported by and extending from said first mentioned spring and pivotally connected to the upper ends of said upwardly extending arms, said links and upwardly extending arms having that portion which is connected to the said yoke bearing against the outside thereof, and formed to position the other portion in alignment with the sides of the yoke.

In testimony whereof, I affix my signature hereto.

LOUIS BOYD.